(No Model.)
P. H. FARREY.
PIPE COUPLING.
No. 552,319. Patented Dec. 31, 1895.
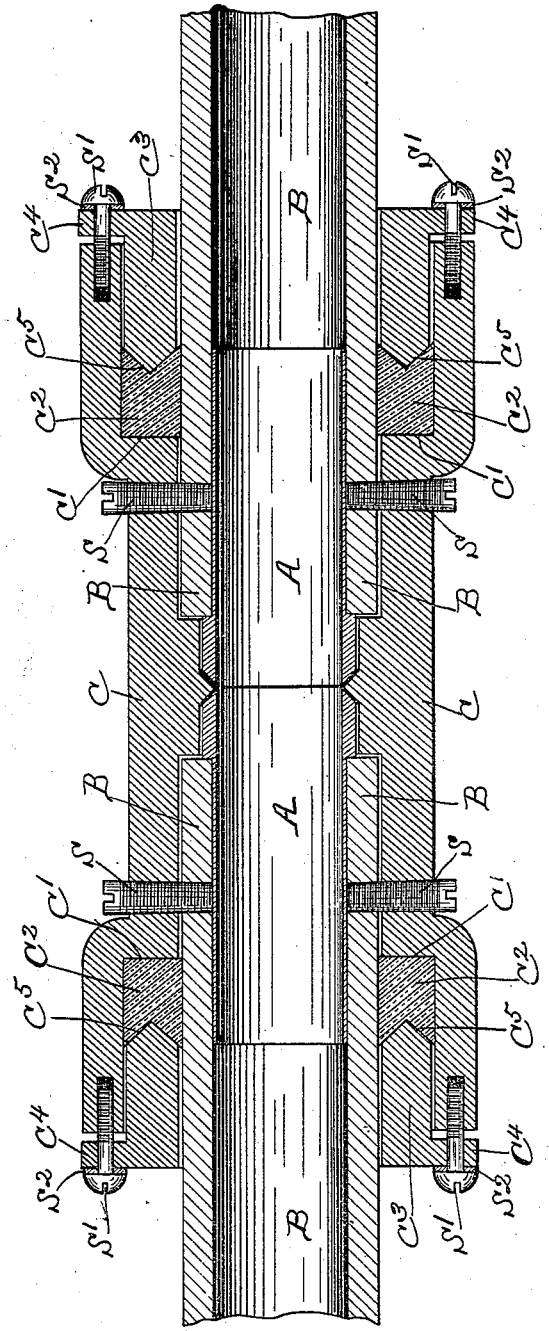
Witnesses:
J. G. Curtis.
G. H. Curtis.
Inventor:
Philip H. Farrey
By Mosher & Curtis
Attys
ANDREW B. GRAHAM, PHOTO-LITHO. WASHINGTON, D.C.

UNITED STATES PATENT OFFICE.

PHILIP H. FARREY, OF AMSTERDAM, NEW YORK.

PIPE-COUPLING.

SPECIFICATION forming part of Letters Patent No. 552,319, dated December 31, 1895.

Application filed May 18, 1895. Serial No. 549,780. (No model.)

*To all whom it may concern:*

Be it known that I, PHILIP H. FARREY, a citizen of the United States, residing at Amsterdam, county of Montgomery, and State of New York, have invented certain new and useful Improvements in Pipe-Couplings, of which the following is a specification.

The invention relates to such improvements; and it consists of the novel construction and combination of parts hereinafter described and subsequently claimed.

Reference may be had to the accompanying drawing, and the letters of reference marked thereon, which forms a part of this specification.

The single figure of the drawing represents a central longitudinal section of my improved coupling connecting together the ends of two lead pipes.

In carrying out my invention a hard-metal bushing A is first inserted in the end of each lead pipe B to strengthen and support the same. The bushed ends of the lead pipes are then inserted in the opposite ends of the coupling-sleeve C and secured therein by the set-screws S, severally inserted in screw-threaded apertures in the sleeve-wall and forced partly or entirely through the respective walls of the lead pipes against the inserted bushings. The bushings are made sufficiently strong to resist the crushing strain caused by forcing the screws through the pipe-walls and to prevent the pipe from collapsing. The sleeve is provided near each end with an inner annular flange or shoulder $C'$, against which the packing $C^2$ is forced by the follower $C^3$, inserted in the end of the sleeve and inclosing the lead pipe. The follower is provided on its outer end with a flange $C^4$, located exteriorly of the sleeve and connected therewith by a plurality of screws $S'$ severally passing loosely through apertures in the flange and fitting into screw-threaded apertures in the end of the sleeve. The heads of the several screws engage the outer side of the follower-flange or an interposed washer $S^2$, whereby the follower may be forced into the sleeve by operating the screws to compress the packing. The inner end of the follower is preferably wedge-shaped in cross-section, as shown at $C^5$, whereby it is made to divide the packing and force it against the inner wall of the sleeve and the inclosed lead pipe to make an effective joint. The packing is thus made to engage the lead pipe with considerable force, and I prefer to project the bushing a sufficient distance into the lead pipe to extend outwardly beyond the shoulder $C'$ when the pipe is inserted within the sleeve, thereby enabling the bushing to support the pipe against the crushing force exerted by the packing.

The screws S are slightly tapered toward their inner ends, and their respective sleeve-apertures are similarly tapered, whereby the engaging threads are caused to bind when the screws are forced to their seats and to form a water-tight joint. The binding friction also tends to prevent the screws from being accidentally unscrewed.

What I claim as new, and desire to secure by Letters Patent, is—

1. In a pipe-coupling, the combination with the pipe of a coupling-sleeve inclosing one end of the pipe and provided with an inner annular shoulder and a plurality of screw-threaded apertures, a plurality of set-screws severally inserted in the sleeve-apertures and engageable with the inclosed end of the pipe, a follower, screw-connections between the follower and sleeve, and packing interposed between the follower and sleeve-shoulder, substantially as described.

2. In a pipe-coupling, the combination with a lead-pipe, and a hard-metal bushing inserted in the end of the pipe, of a coupling-sleeve inclosing the bushed end of the pipe and provided with an inner annular shoulder and a plurality of screw-threaded apertures, a plurality of set-screws severally inserted in the sleeve-apertures and engageable with the inclosed pipe and bushing, a follower, screw-connections between the follower and sleeve, and packing interposed between the follower and sleeve-shoulder, substantially as described.

3. In a pipe-coupling, the combination with a lead pipe and a hard-metal bushing inserted in the end of the pipe of a coupling-sleeve inclosing the bushed end of the pipe and provided with an inner annular shoulder and a plurality of screw-threaded apertures, a plurality of tapered set-screws severally inserted in the sleeve-apertures to form a tight joint, and engageable with the inclosed pipe and bushing, a follower, screw-connections between the follower and sleeve, and packing interposed between the follower and sleeve-shoulder, substantially as described.

In testimony whereof I have hereunto set my hand this 4th day of May, 1895.

PHILIP H. FARREY.

Witnesses:
FLORENCE J. SULLIVAN,
W. B. ADRIANCE.